United States Patent
Bland et al.

(10) Patent No.: US 8,607,003 B2
(45) Date of Patent: Dec. 10, 2013

(54) MEMORY ACCESS TO A DUAL IN-LINE MEMORY MODULE FORM FACTOR FLASH MEMORY

(75) Inventors: Patrick M. Bland, Raleigh, NC (US); Dhruv M. Desai, Cary, NC (US); Jimmy G. Foster, Sr., Morrisville, NC (US); Makoto Ono, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 219 days.

(21) Appl. No.: 13/183,776

(22) Filed: Jul. 15, 2011

(65) Prior Publication Data

US 2013/0019048 A1 Jan. 17, 2013

(51) Int. Cl.
G06F 12/06 (2006.01)
G06F 13/378 (2006.01)

(52) U.S. Cl.
USPC ............... 711/144; 711/103; 711/E12.008; 711/E12.034

(58) Field of Classification Search
USPC .............. 711/103, 144, E12.008, E12.019, 711/E12.034
See application file for complete search history.

(56) References Cited

U.S. PATENT DOCUMENTS

| 5,611,074 | A * | 3/1997 | Kantz et al. ............ 711/146 |
| 6,434,648 | B1 * | 8/2002 | Assour et al. ............ 710/305 |
| 7,499,339 | B2 | 3/2009 | Lin |
| 7,757,037 | B2 | 7/2010 | Chen |
| 2002/0053041 | A1 | 5/2002 | Wyld |
| 2007/0174573 | A1 * | 7/2007 | Shiota et al. ............ 711/163 |
| 2008/0294409 | A1 * | 11/2008 | Johns ........................ 703/13 |
| 2009/0089492 | A1 | 4/2009 | Yoon et al. |
| 2009/0138673 | A1 | 5/2009 | Wilson et al. |
| 2010/0023674 | A1 | 1/2010 | Aviles |
| 2010/0082882 | A1 * | 4/2010 | Im et al. ............... 711/103 |
| 2011/0035540 | A1 | 2/2011 | Fitzgerald et al. |
| 2011/0072197 | A1 * | 3/2011 | Lund et al. ............. 711/103 |

OTHER PUBLICATIONS

Kamat, A., et al; Simplifying Flash Controller Design, ONFI.org, Mar. 7, 2007, pp. 1-11.

* cited by examiner

Primary Examiner — Hal Schnee
(74) Attorney, Agent, or Firm — Edward J. Lenart; Katherine Brown; Biggers & Ohanian, LLP (57) ABSTRACT

Methods, apparatuses, and computer program products for memory access to a dual in-line memory module (DIMM) form factor flash memory are provided. Embodiments include receiving, by a controller from a processor through cacheable memory in the processor, a read request; transmitting, by the controller, the read request to the DIMM form factor flash memory; polling, by the controller, a read queue in the DIMM form factor flash memory until data is ready for the read request; copying from the DIMM form factor flash memory, by the controller, the data corresponding to the read request to a read queue in the controller; transmitting, by the controller on an interface between the controller and the processor, an invalidate command for the cacheable memory; and in response to receiving the invalidate command, reading by the processor the data stored in the read queue in the controller.

17 Claims, 4 Drawing Sheets

MEMORY ACCESS TO A DUAL IN-LINE MEMORY MODULE FORM FACTOR FLASH MEMORY

BACKGROUND OF THE INVENTION

1. Field of the Invention

The field of the invention is data processing, or, more specifically, methods, apparatuses, and computer program products for memory access to a dual in-line memory module (DIMM) form factor flash memory.

2. Description of Related Art

Flash memory is a type of non-volatile computer storage chip that can be electronically erased and reprogrammed. Flash memory may be implemented on dual in-line memory module (DIMM) form factor. During portions of read and write transactions to DIMM form factor flash memory, the DIMM form factor flash memory is polled to determine transaction statuses before other portions of the read and write transactions are completed. The performance of the component of the system that is tasked with polling the DIMM form factor flash memory is therefore impacted. In systems where the processor polls the DIMM form factor flash memory, the performance of the entire system is impacted.

SUMMARY OF THE INVENTION

Methods, apparatuses, and computer program products for memory access to a dual in-line memory module (DIMM) form factor flash memory are provided. Embodiments include receiving, by a controller from a processor through cacheable memory in the processor, a read request; transmitting, by the controller, the read request to the DIMM form factor flash memory; polling, by the controller, a read queue in the DIMM form factor flash memory until data is ready for the read request; copying from the DIMM form factor flash memory, by the controller, the data corresponding to the read request to a read queue in the controller; transmitting, by the controller on an interface between the controller and the processor, an invalidate command for the cacheable memory; and in response to receiving the invalidate command, reading by the processor the data stored in the read queue in the controller. By shifting the task of polling the DIMM form factor flash memory from the processor to a controller, instead of polling, the processor is free to perform other tasks, thus improving the performance of the system.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
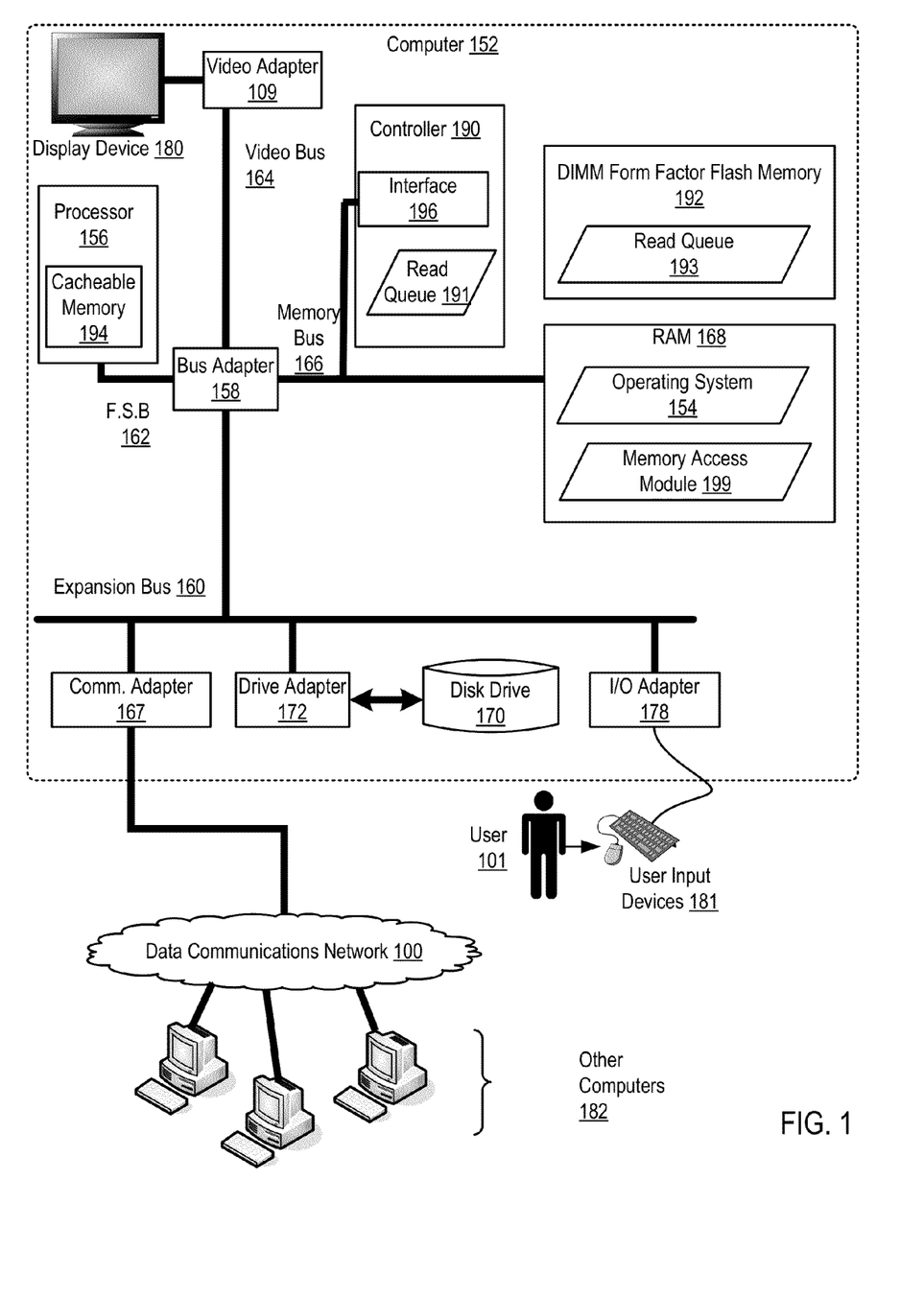
FIG. 1 sets forth a block diagram of automated computing machinery comprising an example computer useful in memory access to a dual in-line memory module (DIMM) form factor flash memory according to embodiments of the present invention.

Example methods, apparatus, and products for memory access to a dual in-line memory module (DIMM) form factor flash memory in accordance with the present invention are described with reference to the accompanying drawings, beginning with FIG. 1. FIG. 1 sets forth a block diagram of automated computing machinery comprising an example computer (152) useful in memory access to a dual in-line memory module (DIMM) form factor flash memory according to embodiments of the present invention. The computer (152) of FIG. 1 includes at least one computer processor (156) with cacheable memory (194), as well as random access memory (168) ('RAM'), which is connected through a high speed memory bus (166) and bus adapter (158) to the processor (156) and to other components of the computer (152).

The computer (152) of FIG. 1 also includes DIMM form factor flash memory (192) and a controller (190) that is configured for memory access to the DIMM form factor flash memory (192). A DIMM form factor flash memory is a type of non-volatile data storage that includes flash memory chips implemented on dual in-line form factor. The controller (190) of FIG. 1 includes an interface (196) for facilitating communication between the controller (190) and the processor (156). Although the interface (196) is illustrated within the controller (190), a controller may be separate from the controller (190) and also may be within a processor. An interface may include a computer readable storage medium to store data used by one or more of the processor (156) and the controller (190).

In general, the controller (190) of FIG. 1 is configured to facilitate communications between the processor (156) and the DIMM form factor flash memory (192). Specifically, the controller (190) of FIG. 1 is configured to receive read requests from the processor (156); transmit the read requests to the DIMM form factor flash memory (192); poll a read queue (193) in the DIMM form factor flash memory (192) until data is ready for the read request; copy from the DIMM form factor flash memory (192) the data corresponding to the read request to a read queue in the controller (190); transmit on an interface (196) between the controller and the processor (156) an invalidate command for the cacheable memory (194).

The controller (190) of FIG. 1 is also configured to receive from the processor (156) through cacheable memory (194) in the processor (190), a write request; read write data for the write request from the cacheable memory (194) in the processor (190); transmit the write request to the DIMM form factor flash memory (192); poll a write status queue for the DIMM form factor flash memory (192) until the data is written to the DIMM form factor flash memory (192); and in response to identifying that the write is complete, update a value identifying to the processor (156) that the write is complete.

Stored in RAM (168) is a memory access module (199) that includes computer program instructions for memory access to a dual in-line memory module (DIMM) form factor flash memory according to embodiments of the present invention. The memory access module (199) provides computer program instructions enabling the computer (152) to access and perform memory operations on the DIMM form factor flash memory (192). The computer program instructions in the memory access module (199) when executed cause the computer (152) to receive, by the controller (190) from the processor (156) through the cacheable memory (194) in the processor (156) a read request. The memory access module (199) also includes computer program instructions that when executed cause the computer (152) to: transmit, by the controller (190), the read request to the DIMM form factor flash memory (192); poll, by the controller (190), a read queue (193) in the DIMM form factor flash memory (192) until data is ready for the read request; and copy from the DIMM form factor flash memory (192), by the controller (190), the data corresponding to the read request to a read queue (191) in the controller (190). The memory access module (199) also includes computer program instructions that when executed cause the computer (152) to: transmit, by the controller (190) on an interface (196) between the controller (190) and the processor (156), an invalidate command for the cacheable memory (194); and in response to receiving the invalidate command, reading by the processor (156) the data stored in the read queue (191) in the controller (190).

Also stored in RAM (168) is an operating system (154). Operating systems useful memory access to a dual in-line memory module (DIMM) form factor flash memory according to embodiments of the present invention include UNIX™, Linux™, Microsoft XP™, AIX™, IBM's i5/OS™, and others as will occur to those of skill in the art. The operating system (154) and the memory access module (199) in the example of FIG. 1 are shown in RAM (168), but many components of such software typically are stored in non-volatile memory also, such as, for example, on a disk drive (170), the DIMM form factor flash memory (192), or the cacheable memory (194) in the processor (156).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for memory access to a dual in-line memory module (DIMM) form factor flash memory according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for memory access to a dual in-line memory module (DIMM) form factor flash memory according to embodiments of the present invention include modems for wired dial-up communications, Ethernet (IEEE 802.3) adapters for wired data communications network communications, and 802.11 adapters for wireless data communications network communications.

Figure 2:
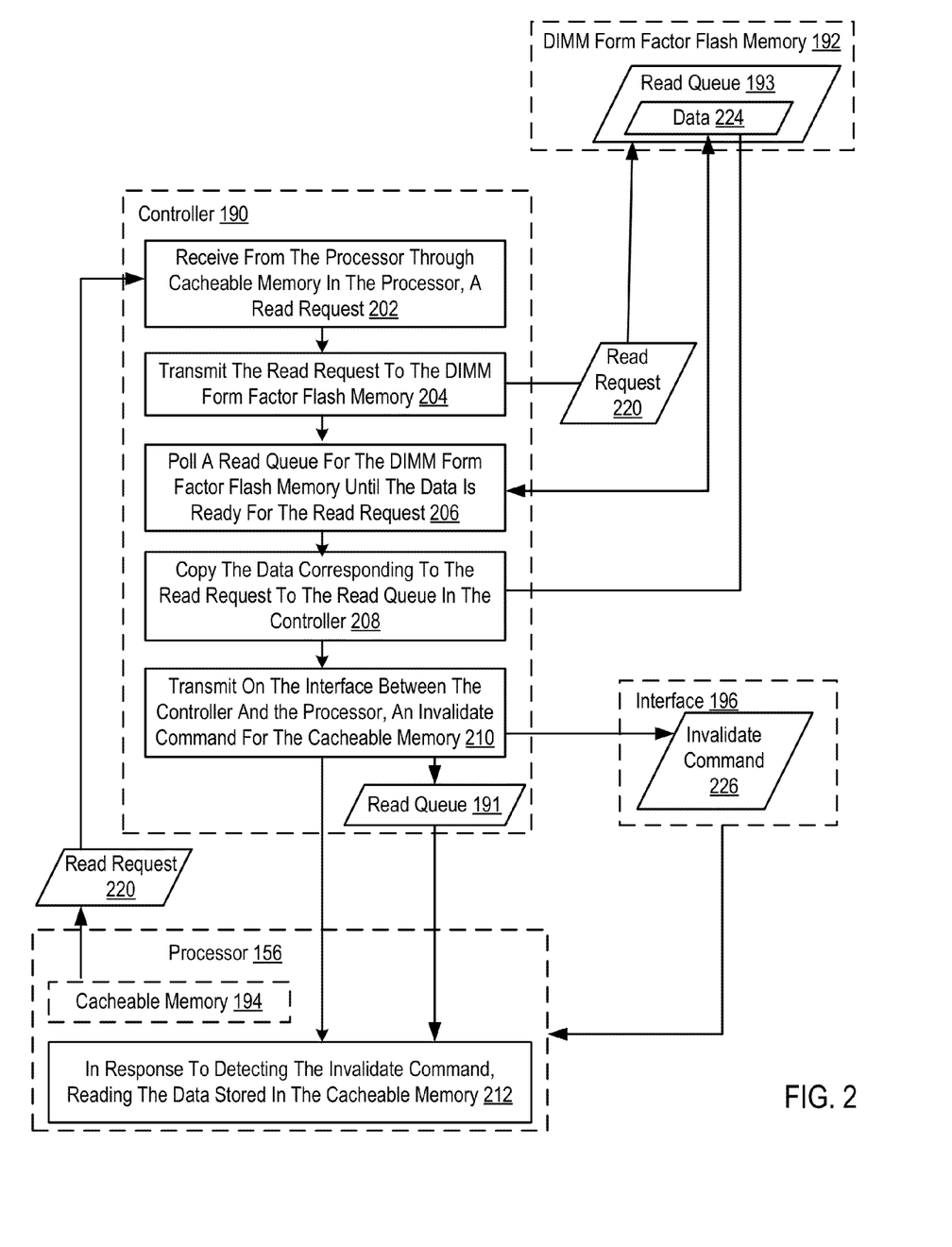
FIG. 2 sets forth a flow chart illustrating an example method for memory access to a DIMM form factor flash memory according to embodiments of the present invention.

For further explanation, FIG. 2 sets forth a flow chart illustrating an example method for memory access to a dual in-line memory module (DIMM) form factor flash memory according to embodiments of the present invention. The method of FIG. 2 includes receiving (202), by a controller (190) from a processor (156) through cacheable memory (194) in the processor (156), a read request (220). Receiving (202) from a processor (156) through cacheable memory (194) in the processor (156) a read request (220) may be carried out by receiving from an application, by a processor (156), a request for data; translating, by the processor (156), the request for data into a read request command; transmitting the read request to the controller (190) via one or more busses; and receiving the read request at the controller (190) via the one or more busses Memory access according to embodiments of the present invention may support multiple processors transmitting read and write requests to the controller (190). To that end, a read request may include a particular field that indicates which processor originated the read request. The controller (190) determines which processors the request originated from and which processor any data, messages, or confirmations should be sent.

The method of FIG. 2 also includes transmitting (204), by the controller (190), the read request (220) to the DIMM form factor flash memory (192). Transmitting (204) the read request (220) to the DIMM form factor flash memory (192) may be carried out by transmitting the read request to the DIMM form factor flash memory (192) via one or more busses; and receiving the read request at the DIMM form factor flash memory (192) via the one or more busses.

The method of FIG. 2 includes polling (206), by the controller (190), a read queue (193) in the DIMM form factor flash memory (192) until data (224) is ready for the read request (220). Polling (206) a read queue (193) in the DIMM form factor flash memory (192) until data (224) is ready for the read request (220) may be carried out by actively sampling, by the controller (190), a status of the read queue (193) in the DIMM form factor flash memory (192); and determining if the status indicates that the read queue (193) has the requested data. The DIMM form factor flash memory may maintain a status of the memory's read queue. Such status may be implemented in a variety of ways including, for example, as a predefined memory location known to the controller (190), where one of two values is present—a value representing a ready state or value representing a not ready state. Alternatively, the status of the read queue may be implemented as field, a bit, a flag, and so on as will occur to readers of skill in the art.

The method of FIG. 2 also includes copying (208) from the DIMM form factor flash memory (192), by the controller (190), the data (224) corresponding to the read request (220) to a read queue (191) in the controller (190). Copying (208) from the DIMM form factor flash memory (192) the data (224) corresponding to the read request (220) to a read queue (191) in the controller (190) may be carried out by retrieving the data (224) from the DIMM form factor flash memory (192); and transmitting a copy of the data to the read queue (191) in the controller (190).

The method of FIG. 2 includes transmitting (210), by the controller (190) on an interface (196) between the controller (190) and the processor (156), an invalidate command (226) for the cacheable memory (194). An invalidate command, as the term is used in this specification, is a command indicating a particular location within the cacheable memory to invalidate. Transmitting (210) on an interface (196) between the controller (190) and the processor (156) an invalidate command (226) for the cacheable memory (194) may be carried out by transmitting to the interface (196) by the controller (190) the invalidate command (226); receiving by the interface (196) the invalidate command (226); and transmitting by the interface (196) the invalidate command (226) to the processor (156).

The method of FIG. 2 includes in response to receiving the invalidate command (226), reading (212) by the processor (156) the data (224) stored in the read queue (191) in the controller (190). Reading (212) the data (224) stored in the read queue (191) in the controller (190) may be carried out by retrieving the data (224) stored in the read queue (191) in the controller (190).

Figure 3:
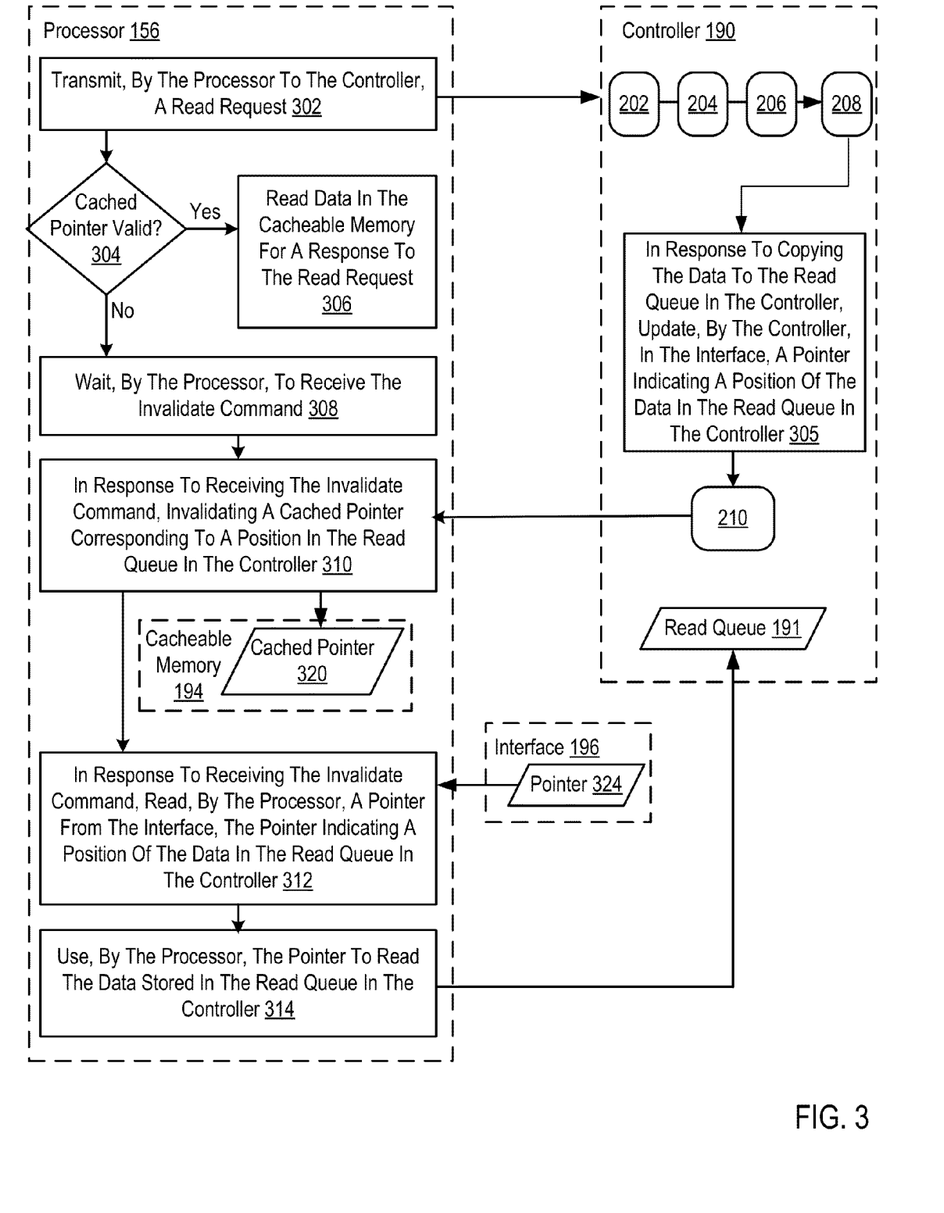
FIG. 3 sets forth a flow chart illustrating a further example method for memory access to a DIMM form factor flash memory according to embodiments of the present invention.

For further explanation, FIG. 3 sets forth a flow chart illustrating a further example method for memory access to a dual in-line memory module (DIMM) form factor flash memory according to embodiments of the present invention. The method of FIG. 3 is similar to the method of FIG. 2, including receiving (202), by a controller (190) from a processor (156) through cacheable memory (194) in the processor (156), a read request (220); transmitting (204), by the controller (190), the read request (220) to the DIMM form factor flash memory (192); polling (206), by the controller (190), a read queue (193) in the DIMM form factor flash memory (192) until data (224) is ready for the read request (220); copying (208) from the DIMM form factor flash memory (192), by the controller (190), the data (224) corresponding to the read request (220) to a read queue (191) in the controller (190); transmitting (210), by the controller (190) on an interface (196) between the controller (190) and the processor (156), an invalidate command (226) for the cacheable memory (194).

The method of FIG. 3 differs from the method of FIG. 2, however, in that the method of FIG. 3 includes transmitting (302), by the processor (156) to the controller (190), a read request. Transmitting (302) to the controller (190), a read request may be carried out by receiving from an application, by a processor (156), a request for data; translating, by the processor (156), the request for data into a read request command; transmitting the read request to the controller (190) via one or more busses; and receiving the read request at the controller (190) via the one or more busses.

The method of FIG. 3 includes determining (304), by the processor (156), whether a cached pointer (320) within the cacheable memory (194) is valid. Determining (304) whether a cached pointer (320) within the cacheable memory (194) is valid may be carried out by determining if the cached pointer (320) has been called; determining what addresses the top pointer of the cached pointer (320) indicates and what address the tail pointer of the cached pointer (320) indicates; determine if the top and tail pointers point to the same address; if they point to the same address, determine that the cached pointer is not valid; and if they point to different addresses, determine that the cached pointer is valid.

The method of FIG. 3 includes if the cached pointer (320) is valid, reading (306), by the processor, data in the cacheable memory (194) for a response to the read request. Reading (306) data in the cacheable memory (194) for a response to the read request may be carried out by retrieving the data in the cacheable memory; and transmitting the retrieved data to a user or application requesting the data.

The method of FIG. 3 includes if the cached pointer (320) is not valid, waiting (308), by the processor (156), to receive the invalidate command. Waiting (308) to receive the invalidate command may be carried out by the processor performing other tasks besides polling until receiving the invalidate command. By shifting the task of polling the DIMM form factor flash memory from the processor to a controller, instead of polling, the processor is free to perform other tasks, thus improving the performance of the system.

The method of FIG. 3 includes in response to copying the data to the read queue (191) in the controller (190), updating (305), by the controller (190), in the interface (196) between the controller (190) and the processor (156), a pointer (324) indicating a position of the data (224) in the read queue (1910 in the controller (190). Updating (305) in the interface (196) between the controller (190) and the processor (156), a pointer (324) indicating a position of the data (224) in the read queue (1910 in the controller (190) may be carried out by determining the addresses of the beginning and the ending locations of the data within the read queue (191) in the controller (190); and storing the beginning and ending locations of the data as the pointer (324).

The method of FIG. 3 includes in response to receiving the invalidate command, invalidating (310), by the processor (156), a cached pointer (320) corresponding to a position in the read queue (191) in the controller (190), the cached pointer (320) stored in the cacheable memory (194) in the processor (156). Invalidating (310) a cached pointer (320) corresponding to a position in the read queue (191) in the controller (190), the cached pointer (320) stored in the cacheable memory (194) in the processor (156) may be carried out by storing one or more bits indicating that the cached pointer has expired and is no longer valid.

The method of FIG. 3 includes in response to receiving the invalidate command, reading (312), by the processor (156), a pointer (324) from the interface (196), the pointer (324) indicating a position of the data (224) in the read queue (191) in the controller (190). Reading (312) a pointer (324) from the interface (196), the pointer (324) indicating a position of the data (224) in the read queue (191) in the controller (190) may be carried out by retrieving from the pointer (324) data indicating an address in the read queue (191) in the controller (190).

The method of FIG. 3 includes using (314), by the processor (156), the pointer (324) to read the data (224) stored in the read queue (191) in the controller (190). Using (314) the pointer (324) to read the data (224) stored in the read queue (191) in the controller (190) may be carried out by transmitting an address retrieved from the pointer (324); and retrieving data at the address in the read queue (191) associated with the transmitted address.

Figure 4:
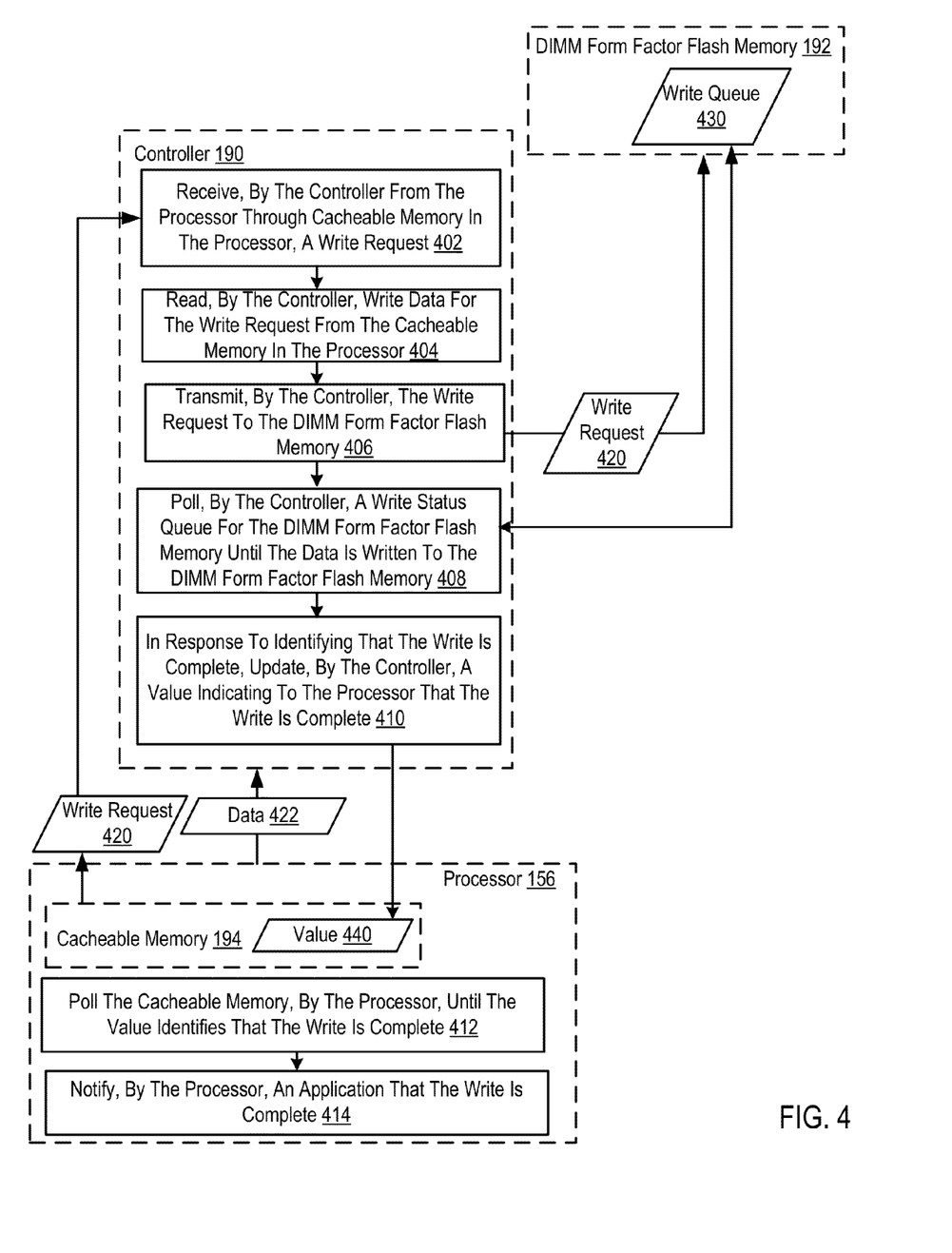
FIG. 4 sets forth a flow chart illustrating a further example method for memory access to a DIMM form factor flash memory according to embodiments of the present invention.

For further explanation, FIG. 4 sets forth a flow chart illustrating a further example method for memory access to a dual in-line memory module (DIMM) form factor flash memory according to embodiments of the present invention. The method of FIG. 4 includes receiving (402), by a controller (190) from a processor (156) through cacheable memory (194) in the processor (156), a write request (420). Receiving (402) from a processor (156) through cacheable memory (194) in the processor (156) a write request (420) may be carried out by receiving from an application, by a processor (156), a request for storage of data; translating, by the processor (156), the request for storage of data into a write request command; transmitting the write request to the controller (190) via one or more busses; and receiving the write request at the controller (190) via the one or more busses.

The method of FIG. 4 includes reading (404), by the controller (190), write data (422) for the write request (420) from the cacheable memory (194) in the processor (156). Reading (404) write data (422) for the write request (420) from the cacheable memory (194) in the processor (156) may be carried out by retrieving, by the controller (190), the write data (422) from the cacheable memory (194) in the processor (156).

The method of FIG. 4 includes transmitting (406), by the controller (190), the write request (420) to the DIMM form factor flash memory (192). Transmitting (406) the write request (420) to the DIMM form factor flash memory (192) may be carried out by transmitting both the data (422) retrieved from the cacheable memory (194) and the write request (420) to the DIMM form factor flash memory (192).

The method of FIG. 4 includes polling (408), by the controller (190), a write queue (430) for the DIMM form factor flash memory (192) until the data (422) is written to the DIMM form factor flash memory (192). A write queue and a read queue may include status register for indicating a status of the write queue and also data for writing to a DIMM form factor flash memory. Polling (408) a write queue (430) for the DIMM form factor flash memory (192) until the data (422) is written to the DIMM form factor flash memory (192) may be carried out by actively sampling the write queue (430) in the DIMM form factor flash memory (192); and determining if a value in the write queue (430) indicates that the data (422) has been completely written into the DIMM form factor flash memory (192). By shifting the task of polling the DIMM form factor flash memory from the processor to a controller, instead of polling, the processor is free to perform other tasks, thus improving the performance of the system.

The method of FIG. 4 includes in response to identifying that the write is complete, updating (410), by the controller (190), a value (440) identifying to the processor (156) that the write is complete. Updating (410) a value (440) identifying to the processor (156) that the write is complete may be carried out by storing a value in the cacheable memory (194) in the processor (156). The value (440) is illustrated as stored in the cacheable memory (194); however, a value indicating that the write is complete may be stored in any number of locations, such as the interface (196) or the controller (190).

The method of FIG. 4 includes polling (412) the cacheable memory (194), by the processor (156), until the value (440) identifies that the write is complete. Polling (412) the cacheable memory (194) until the value (440) identifies that the write is complete may be carried out by sampling the cacheable memory (194); and determining if a value in the cacheable memory (194) indicates that the data (422) has been completely written into the DIMM form factor flash memory (192). The controller (190) is configured to store a value in the cacheable memory (194) in the processor (156); or transmit a value to the processor (156). The cacheable memory (194) is within the processor (156) and the processor (156) is able to poll the cacheable memory (194) faster than polling the DIMM form factor flash memory (192). Thus, a system having the processor (156) poll the cacheable memory (194) may be faster than a system in which the processor (156) polls the DIMM form factor flash memory (192) to determine the status of a write.

The method of FIG. 4 includes notifying (414), by the processor (156), an application that the write is complete. Notifying (414) an application that the write is complete may be carried out by transmitting to the application a message indicating that the write data has been written to the DIMM form factor flash memory (192).

Example embodiments of the present invention are described largely in the context of a fully functional computer system for memory access to a dual in-line memory module (DIMM) form factor flash memory. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of memory access to a dual in-line memory module (DIMM) form factor flash memory, the method comprising
    receiving, by a controller from a processor through cacheable memory in the processor, a read request;
    transmitting, by the controller, the read request to the DIMM form factor flash memory;
    polling, by the controller, a read queue in the DIMM form factor flash memory until data is ready for the read request;
    copying from the DIMM form factor flash memory, by the controller, the data corresponding to the read request to a read queue in the controller;
    transmitting, by the controller on an interface between the controller and the processor, an invalidate command for the cacheable memory; and
    in response to receiving the invalidate command, reading by the processor the data stored in the read queue in the controller.

2. The method of claim 1 further comprising in response to copying the data to the read queue in the controller, updating, by the controller, in the interface between the controller and the processor, a pointer indicating a position of the data in the read queue in the controller.

3. The method of claim 1 further comprising in response to receiving the invalidate command, invalidating, by the processor, a cached pointer corresponding to a position in the read queue in the controller, the cached pointer stored in the cacheable memory in the processor.

4. The method of claim 1 further comprising:
    in response to receiving the invalidate command, reading, by the processor, a pointer from the interface, the pointer indicating a position of the data in the read queue in the controller; and
    using, by the processor, the pointer to read the data stored in the read queue in the controller.

5. The method of claim 1 further comprising:
    determining, by the processor, whether a cached pointer within the cacheable memory is valid; and
    if the cached pointer is valid, reading data in the cacheable memory for a response to the read request.

6. The method of claim 1 wherein the interface includes memory within the controller.

7. The method of claim 1 wherein the read request includes a field indicating a particular processor that generated the read request.

8. An apparatus for memory access to a dual in-line memory module (DIMM) form factor flash memory, the apparatus comprising a computer processor, a computer memory operatively coupled to the computer processor, the computer memory having disposed within it computer program instructions that when executed cause the apparatus to:

receive, by a controller from a processor through cacheable memory in the processor, a read request;

transmit, by the controller, the read request to the DIMM form factor flash memory;

poll, by the controller, a read queue in the DIMM form factor flash memory until data is ready for the read request;

copy from the DIMM form factor flash memory, by the controller, the data corresponding to the read request to a read queue in the controller;

transmit, by the controller on an interface between the controller and the processor, an invalidate command for the cacheable memory; and     in response to receiving the invalidate command, read by the processor the data stored in the read queue in the controller.

9. The apparatus of claim 8 further comprising computer program instructions to: in response to copying the data to the read queue in the controller, update, by the controller, in the interface between the controller and the processor, a pointer indicating a position of the data in the read queue in the controller.

10. The apparatus of claim 8 further comprising computer program instructions to: in response to receiving the invalidate command, invalidate, by the processor, a cached pointer corresponding to a position in the read queue in the controller, the cached pointer stored in the cacheable memory in the processor.

11. The apparatus of claim 8 further comprising computer program instructions to:

in response to receiving the invalidate command, read, by the processor, a pointer from the interface, the pointer indicating a position of the data in the read queue in the controller; and     use, by the processor, the pointer to read the data stored in the read queue in the controller.

12. The apparatus of claim 8 further comprising computer program instructions to:

determine, by the processor, whether a cached pointer within the cacheable memory is valid; and     if the cached pointer is valid, read data in the cacheable memory for a response to the read request.

13. A computer program product for memory access to a dual in-line memory module (DIMM) form factor flash memory, the computer program product disposed upon a computer readable storage medium, the computer program product comprising computer program instructions capable, when executed, of causing a computer to carry out the steps of:

receiving, by a controller from a processor through cacheable memory in the processor, a read request;

transmitting, by the controller, the read request to the DIMM form factor flash memory;

polling, by the controller, a read queue in the DIMM form factor flash memory until data is ready for the read request;

copying from the DIMM form factor flash memory, by the controller, the data corresponding to the read request to a read queue in the controller;

transmitting, by the controller on an interface between the controller and the processor, an invalidate command for the cacheable memory; and     in response to receiving the invalidate command, reading by the processor the data stored in the read queue in the controller.

14. The computer program product of claim 13 further comprising in response to copying the data to the read queue in the controller, updating, by the controller, in the interface between the controller and the processor, a pointer indicating a position of the data in the read queue in the controller.

15. The computer program product of claim 13 further comprising in response to receiving the invalidate command, invalidating, by the processor, a cached pointer corresponding to a position in the read queue in the controller, the cached pointer stored in the cacheable memory in the processor.

16. The computer program product of claim 13 further comprising:

in response to receiving the invalidate command, reading, by the processor, a pointer from the interface, the pointer indicating a position of the data in the read queue in the controller; and     using, by the processor, the pointer to read the data stored in the read queue in the controller.

17. The computer program product of claim 13 further comprising:

determining, by the processor, whether a cached pointer within the cacheable memory is valid; and     if the cached pointer is valid, reading data in the cacheable memory for a response to the read request.

\* \* \* \* \*